United States Patent
Sollock

(10) Patent No.: US 6,390,026 B1
(45) Date of Patent: May 21, 2002

(54) ROPING STEER LEG SAVER

(76) Inventor: Harold Dean Sollock, Hwy. 395 South, Hondo, NM (US) 88336

( * ) Notice: Subject to any disclaimer, the term of this patent is extended or adjusted under 35 U.S.C. 154(b) by 0 days.

(21) Appl. No.: 09/615,600

(22) Filed: Jul. 13, 2000

(51) Int. Cl.[7] .............................................. A01K 13/00
(52) U.S. Cl. .................................................... 119/850
(58) Field of Search .............................. 119/850; 2/22, 2/24, 16; 602/75; 128/881, 822

(56) References Cited

U.S. PATENT DOCUMENTS

| | | | |
|---|---|---|---|
| 438,105 A | * 10/1890 | Geyer | 119/850 |
| 3,209,516 A | * 10/1965 | Hyman | 119/850 |
| 3,209,517 A | * 10/1965 | Hyman | 119/850 |
| 5,910,126 A | * 6/1999 | Wilson et al. | 602/75 |
| 5,926,843 A | * 7/1999 | Winchester | 2/22 |

FOREIGN PATENT DOCUMENTS

| | | | |
|---|---|---|---|
| SE | WO 99/0011 | * | 1/1995 |

* cited by examiner

*Primary Examiner*—Charles T. Jordan
*Assistant Examiner*—Floris C Copier
(74) *Attorney, Agent, or Firm*—John P. Halvonik

(57) ABSTRACT

A leg protection apparatus for steers in the roping industry. The apparatus has an upper and a lower portion. The lower portion has a VELCRO closure alongside the entire edge so that a secure complete cylindrical portion can be fit over the lower part of the hind leg of the steer. The upper portion is of a generally rectangular shape of material and has a series of complimentary VELCRO portions on each end. The upper portion goes above the hock of the same leg. The interior sections of the apparatus use a padding such as an open cell foam padding to further protect the steer.

3 Claims, 1 Drawing Sheet

ROPING STEER LEG SAVER

FIELD AND BACKGROUND OF THE INVENTION

The invention relates to the field of animal husbandry and in particular to protective devices that go around the legs of steers in order to prevent their legs from being burned by the rope during cattle roping.

It is believed that the device will find its greatest utility in the rodeo industry where cattle roping is still done on a regular basis for sport and competition. Such events as the heading and heeling team roping events require the cattle to be lassoed or roped. This is done by throwing the lariat so that it encircles the rear leg of the steer and is then tightened by contestant. Obviously as roping is done on steers that are moving at a fast pace and the lariat is thrown from a moving horse, leg burns are a common occurrence as the tension on the rope and the speed of the cattle create a huge source of friction.

The use of a covering or legging that goes over the rear legs of the cattle will prevent their legs from being burned by the rope during the roping process. It is thought that this will make for a safer industry for the cattle and contribute to the enjoyment of the sport. Such a covering that is padded will also help prevent injury to the steer and a soft material such as open cell foam padding may be used on the inside of the device to further decrease the risk of burns.

PRIOR ART

While there are devices that go around the legs of cattle none of the prior art is designed to protect the cattle from rope burns. Nor are there any devices that are of the same construction.

SUMMARY OF THE INVENTION

A leg protection apparatus for steers that are roped. The apparatus has an upper and a lower portion. The lower portion has a VELCRO closure alongside the entire edge so that a secure complete cylindrical portion can be fit over the lower part of the hind leg of the steer. The upper portion is of a generally rectangular shape of material and has a series of complimentary VELCRO portions on each end. The upper portion goes above the hock of the same leg. The interior sections of the apparatus use a padding such as an open cell foam padding to further protect the steer. The inner surface of the device can be lined with felt or similar materials in order to enhance protection to the leg of the steer.

It is among the objectives of the invention to provide a protective device to the legs of steers in order to prevent leg burns during the cattle roping process.

Another objective is to provide a protective device for steers during the cattle roping process to make such sports as heading and heeling a more enjoyable and safer process for man and beast.

Another objective is to provide protection to the back legs of steers during the roping process.

Other objectives will become known to those skilled in the art once the invention is shown and described.

DESCRIPTION OF THE PREFERRED EMBODIMENT

Figure 1:
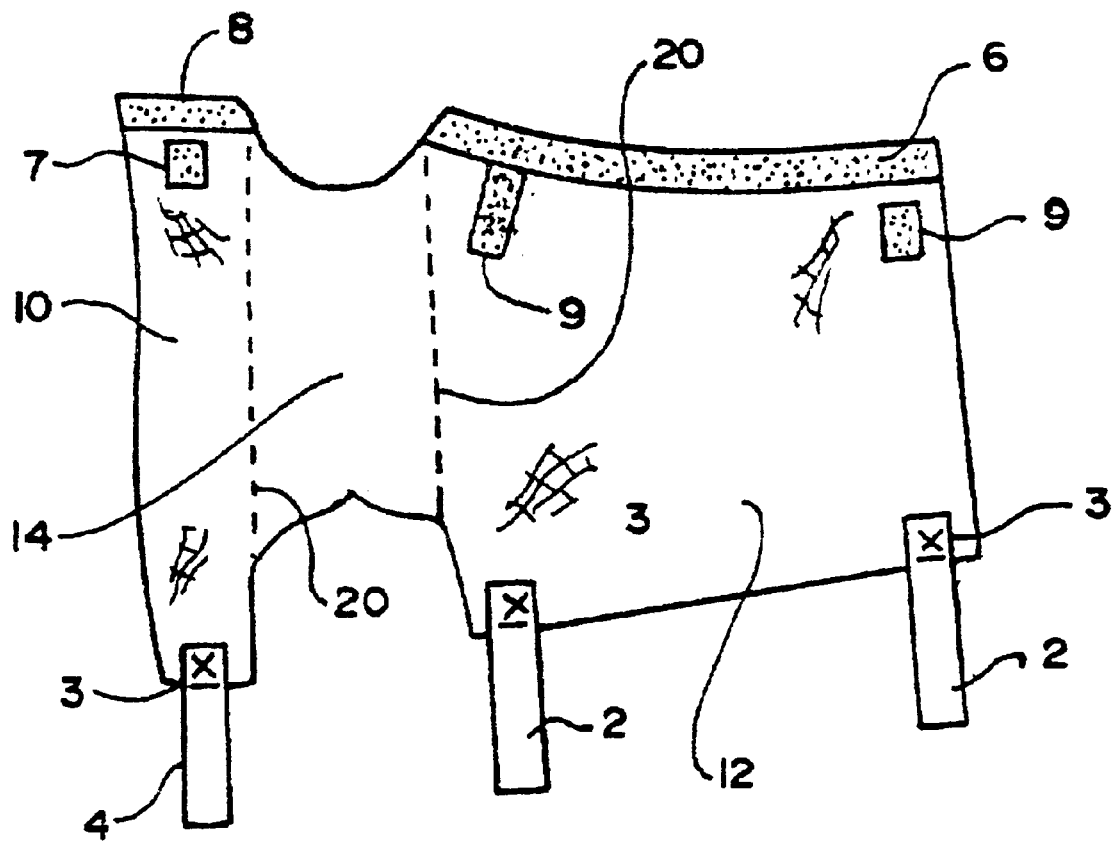
FIG. 1 Overall construction of the device.

The apparatus 1 is shown in FIG. 1. It has an upper 10 and a lower portion 12 as well as an intermediate portion 14. All such portions may be made in the form of a webbing that may be made of nylon, kevlar or other similar materials (CORODURA)-Cordura is a nylon product made by DuPont Company that works well in this regard.

The portions that copmrise the three main portions may be made of one piece of material having two layers so that interior pockets can be formed by stitching placed at appropriate intervals. These pockets can then hold foam padding such as open cell foam padding in the inside of the device. The pockets and the foam padding should be along the entire length of the apparatus (except near the intermediate portion) so that when in place, the steer's leg will be entirely encircled by padding.

The lower portion is longer than the upper portion and is preferably about 6–10" in length. The upper portion has a VELCRO strip 8 running along one edge that is mated with a complimentary VELCRO piece on the strap 4. The pieces may be mated to one another to encircle the upper leg of the steer. An additional VELCRO piece at 7 may be used to provide an additional point of attachment for the piece 4.

The lower section also has a strip 6 running along one edge that is mated with two straps 2 on the opposite edge. Each of the straps has complimentary piece of VELCRO to mate with that on the edge. In addition there may be several smaller VELCRO pieces 9 to help attach the edges to one another. These shorter straps will further strengthen these connections around the steer's lower leg.

Stitching at 3 joins the straps to the main piece of the apparatus. Stitching may also be used to join the other VECLRO strips as well as divide the apparatus into compartments for placement of padding on the inside of the device. Stitching lines shown as 20 will divide the apparatus into more than one compartment corresponding to the different sections.

Closing the VELCRO portions of the lower portion will then form a cylindrical shape out of the lower portion of the apparatus. This portion is in connection with the intermediate portion 14 which is similar but shorter and not as wide and does not have the mating VELCRO portions. Note that all the portions are made of a continuous piece of material so that upper, intermediate and lower section are all connected as one large piece of material.

The intermediate portion is somewhat shorter perhaps 2–4" in height. It does not need to have the padding like the other two pieces since it is designed to be a little more flexible than the other two portions so that it can act as an intermediate connection that can link the upper and lower portions that are on the upper and lower portions of the steer's legs. This portion also does not need to have the VELCRO closures for the same reason.

Note also that the intermediate portion is not of the same width (from edge to edge) as the other two portions (the upper and lower portion are of about the same width). This is so that the edges of the intermediate portions are never joined to one another, but rather the hock of the steer will protrude out between the edges of this intermediate portion and so allow the leg of the steer to bend.

The upper portion of the device is similar to the lower portion and is perhaps 4–7" in length. This portion too has padding on the inside and complimentary type of VELCRO material closures on either edge The edges of the upper portion may be joined together when the time comes by the VELCRO pieces in order to secure the device to the leg of the steer. Complimentary longer VELCRO pieces similar to those on the lower portion may also be used to enhance the joining of the ends.

The apparatus has two surfaces, designated an inner and outer surface. The inner surface is that surface that is in connection with the skin of the steer and the outer portion is on the outside opposite the inner surface, The inner surface would preferably by lined with. a softer material such as open cell foam padding material or similar soft materials, in order to better protect the skin of the cattle, namely steers.

When in use the device should be applied to the rear foreleg of the steer. The edges of the lower portions are joined by the VELCRO to one another and thus go around the steer's rear leg. Then the upper portion is secured by the use of the VELCRO closures above the hock of the animal. The VELCRO closures are used to keep the device in place once it has been tightly wrapped around the leg of the cattle. The animal is now ready to be roped.

I claim:

1. A leg protection apparatus for protection of the hocks of steers and the legs of the steer above and below the hock, said apparatus comprising a lower portion, an intermediate portion and an upper portion, all of said portions being of the same continuous piece of material and all of said potions having an inner surface and an outer surface;

said upper portion comprising a rectangular piece of material and having two side edges opposite one another, an upper edge that hangs free and a lower edge; each of said side edges having complimentary portions of hook and loop mating material for joining said side edges to one another in order to form a cylindrical shaped member by joining of said complimentary portions of hook and loop mating material; said upper portion of a length chosen so that when said edges are joined to one another said portion can encircle the upper leg of the steer;

said intermediate portion in connection with said lower edge of said upper portion, said intermediate portion being of about 2–4" in length and of smaller width than said upper portion, said intermediate portion sized and shaped to accommodate the hock of said steer when said apparatus is placed over the rear leg of the steer and to allow the hock to protrude between said side edges when said upper portion is joined above the hock of the steer;

said lower portion comprising a rectangular piece of material in connection with said intermediate portion and comprising a rectangular piece of material and having two edges opposite one another, each of said edges having complimentary portions of hook and loop mating material so as to form a cylindrical shaped member when said complimentary portions of hook and loop mating material are mated to one another; said lower portion sized and shaped to go over the lower leg of the steer; said lower portion of a length chosen so that when said edges are joined to one another said portion can encircle the lower leg of the steer;

said upper and lower portions having an interior pouch to secure an open cell foam padding material in the interior portions of said apparatus, each of said portions having an inner surface for contact with the skin of the steer and an outer surface opposite said inner surface.

2. The apparatus of claim 1 wherein said inner surface of said upper and lower portions is covered by an open cell foam padding.

3. The apparatus of claim 2 wherein said material of said apparatus is chosen from the group comprising: Kevlar, nylon, or Cordura.

* * * * *